United States Patent [19]

Vargiu et al.

[11] 3,878,159

[45] Apr. 15, 1975

[54] FOUNDRY BINDERS ON THE BASIS OF PHENOLIC RESINS

[75] Inventors: Silvio Vargiu; Silvestro Pezzoli, both of Milan, Italy

[73] Assignee: Societa Italiana Resine S.I.R. S.p.A., Milan, Italy

[22] Filed: June 12, 1973

[21] Appl. No.: 369,346

[30] Foreign Application Priority Data

June 13, 1972 Italy.................................. 25581/72

[52] U.S. Cl. .............. 260/38; 164/43; 260/DIG. 40
[51] Int. Cl............................................. C08g 51/04
[58] Field of Search .......... 260/DIG. 40, 38; 164/43

[56] References Cited
UNITED STATES PATENTS 2,955,336   10/1960   Horn et al..................... 260/DIG. 40
3,692,733   9/1972   Johnson....................... 260/DIG. 40
3,720,642   3/1973   Junger et al. ................ 260/DIG. 40
3,745,139   7/1973   Kachur et al. ............... 260/DIG. 40

*Primary Examiner*—Donald E. Czaja
*Assistant Examiner*—S. M. Person
*Attorney, Agent, or Firm*—Sughrue, Rothwell, Mion, Zinn & Macpeak

[57] ABSTRACT

Foundry binders comprising a) a novolak prepared by condensation of phenols with aldehydes, b) a silane, c) a diamide of a long-chain monocarboxylic acid, and optionally d) an aromatic carboxylic acid and a process for their production. The foundry binders obtained are particularly suitable for the hot coating of foundry sand in the absence of solvents.

6 Claims, No Drawings

FOUNDRY BINDERS ON THE BASIS OF PHENOLIC RESINS

The invention relates to foundry binders based on phenolic resins and their use for the hot coating of core and moulding sands in the absence of solvents.

The use of phenolic resins of the novolak type for the coating of moulding sand is known. For this purpose, the phenolic resin is either used directly or a solution of the phenolic resin in a suitable organic solvent is used. In the latter case the novolak phenolic resin is dissolved in an organic solvent and the resulting solution is mixed with the moulding sand. The phenolic resin is usually used in a quantity of 3 to 5 wt.% with respect to the moulding sand. Hexamethylenetetramine is then added, the composition is homogenized, and the solvent is removed at temperatures between room temperature and about 100°C by introduction of a stream of gas.

A modification of this process consists in mixing the moulding sand with powdered phenolic resin and hexamethylenetetramine and then dissolving the phenolic resin by addition of an organic solvent. After homogenization of the composition, the solvent is removed as described above.

However, these known processes have many disadvantages, which are associated inter alia with the harmfulness and flammability of the volatile solvents used. The processes are also expensive, since the coating of the moulding sands takes relatively long time (generally 10–20 minutes) and the solvent cannot usually be recovered.

In another known process, moulding sand is coated with a thermosetting resin, particularly a novolak phenolic resin, and hexamethylenetetramine without the use of solvents, the operating temperatures then being above room temperature. In this process, solid phenolic resin in flake form is mixed with the heated moulding sand thereby melting the resin. More particularly, the procedure is as follows. Moulding sand heated to temperatures of 130° to 170°C is introduced into a suitable mixer, in which it is mixed with 2 to 5 wt.% of flake resin. Hexamethylenetetramine is then added, usually as an aqueous solution, and the resulting composition is heated for a certain time. Because of the temperature of the moulding sand, the phenolic resin melts and coats the sand grains with a thin film. The coated moulding sand produced in this way is generally flowable and can be stored for long periods. In the production of foundry cores and moulds, the film on the coated sand grains melts and cures so that parts having high mechanical strength are formed.

The hot coating of moulding sand in the absence of solvents requires binders having special properties, e.g. a low softening point, high fluidity in the molten state, and fast heat-curability. The melting point of the binder should preferably be 50° to 80° C, and the flowability should be 60 – 120 mm, the flowability being measured with the aid of a plate heated to 125°C and inclined at 64°. The flowability of the binder is particularly important for fast and uniform coating of the sand grains. Whereas working time can be saved on the one hand, smaller quantities of binder are required with uniform coating. Fast heat-curability of the binder not only allows the production of cores and moulds having high mechanical strength but also prevents scaling. Scaling is the removal of surface layers of the mould or core on removal of the heat source, with the result that moulds of nonuniform thickness are formed.

An object of the invention is therefore to provide new foundry binders on the basis of novolak phenolic resins that have a low softening point and high fluidity in the molten state, that are rapidly thermosetting at relatively high curing temperatures, and give cores or moulds having improved mechanical strength on hot coating of foundry sand in the absence of solvents.

It has been found that moulds and cores having improved mechanical strength can be obtained by coating foundry sand with a binder comprising a novolak and a silane. The mechanical properties can be still further improved by the use of diamide of a long-chain monocarboxylic acid in combination with the silane and the novolak. Finally, it has been found that the fluidity of mixtures of the phenolic resin and the diamide can be increased by addition of silanes.

The invention thus relates to foundry binders on the basis of phenolic resins, comprising a. a novolak prepared by condensation of phenols with aldehydes in a molar ratio of about 1:0.4 to 0.9 in the presence of an acid catalyst,
b. about 0.05 to about 1.0 wt.% of a silane, and
c. about 0.5 to about 8.0 wt.% of the diamide of a long-chain monocarboxylic acid, and optionally
d. about 1.0 to about 6.0 wt.% of an aromatic carboxylic acid.

Novolaks suitable for the purposes of the invention are prepared by condensation of a phenol with an aldehyde in a molar ratio of about 1:0.4 to 0.9 in the presence of an acid catalyst.

Specific examples of suitable phenolic compounds are phenol, which may be substituted in the o- and/or p-position, o-, m-, and p-cresol, xylenols, and resorcinol, phenol being preferred.

The preferred aldehyde is formaldehyde; it may be used either as aqueous formalin solution, in the form of oligomers such as paraformaldehyde, or in the form of compounds that liberate formaldehyde.

Organic or inorganic acids are used as catalysts, and are added to the reaction medium in a quantity of 0.1 to 5.0 wt.% with respect to the phenolic compound. Specific examples of such acid catalysts are mineral acids or sulfonic acids such as p-toluenesulfonic acid and phenolsulfonic acid, carboxylic acids, such as oxalic and maleic acids or other carboxylic acids having a dissociation constant greater than $1.76 \times 10^{-5}$.

It is absolutely essential to adhere to a molar ratio of aldehyde to phenolic compound of about 0.4:1 to about 0.9:1. Lower ratios are unfavourable on economic grounds, whereas higher ratios give binders that impart unsatisfactory properties to the foundry moulds.

The novolak condensation is carried out at temperatures of about 80° to about 160°C until the content of free formaldehyde in the reaction products reaches values lower than 3 wt.%.

Specific silanes that are suitable for the purpose of the invention have the general formula $$R'Si(OR)_3$$

where R is an ethyl or methyl group group and R' may be a residue of any nature, preferably a vinyl group or an alkyl residue substituted with mercapto groups, optionally substituted amino residues, epoxyalkyl residues, or epoxycycloalkyl residues.

Specific examples of such silanes are γ-aminopropyltriethoxysilane, β-aminoethyltrimethoxysilane, γ-glycidoxypropyltrimethoxysilane, β-(3,4-epoxycyclohexyl)ethyltrimethoxysilane, γ-mercaptopropyltrimethoxysilane, vinyltriethoxysilane, N,N-bis-(β-hydroxyethyl)-γ-aminopropyltriethoxysilane, and vinyltrimethoxysilane. The foundry binders of the invention contain the silane in a quantity of about 0.05 to about 1.0 wt.%.

Specific diamides that are suitable for the purposes of the invention have the general formula

$$(RCO)_2-N(CH_2)_n-NH_2$$

where $n$ is an integer from 2 to 6 and R is an alkyl residue having 11 to 20 carbon atoms in the chain.

Specific examples of such diamides are bis-stearoylethylenediamide, bispalmitoylethylenediamide, bislauroylethylenediamide, bisstearoylpropylenediamide, bis-stearoyltetramethylenediamide, bisstearoylpentamethylenediamide, bis-stearoylhexamethylenediamide, bispalmitoylpropylenediamide, bispalmitoyltetramethylenediamide, and bispalmitoylpentamethylenediamide. The foundry binders of the invention contain about 0.5 to 8.0 wt.%, preferably about 3.0 to 5.0 wt.%, of the diamide.

In the production of the foundry binders of the invention, the manner in which the silane and the diamide are added to the novolak is critical. The silane and the diamide are incorporated into the novolak only after completion of the condensation and after complete removal of the reaction water at temperatures of about 120° to 170°C, i.e. the novolak should have a fluidity of about 90 to 110 mm, preferably 100 to 106 mm. With fluidity values outside these limits, the binder imparts unsatisfactory mechanical properties to the foundry moulds or cores produced.

The foundry binders of the invention may contain conventional aromatic carboxylic acids in a quantity of about 1.0 to 6.0 wt.%. Special examples of such acids are benzoic acid, salicylic acid, and p-tert-butylbenzoic acid. In the production of the binders, the aromatic carboxylic acids are incorporated into the novolak in the same way as the diamide and the silane.

The invention is illustrated by the following non-limiting examples. All parts and percent are by weight.

Preparation of a Novolak Phenolic Resin

A three-neck flask fitted with a reflux condenser, a thermometer, and a stirrer, is charged with phenol, an aqueous 36 % formaldehyde solution, an oxalic acid in a quantity of 1 part per 100 parts of phenol. The resulting mixture is heated under reflux until the aqueous phase contains 1 to 3 % of formaldehyde. The reaction time required is about 2 hours. The water is then distilled off at 150° to 160°C and normal pressure at the bottom of the column. The novolak obtained has a fluidity of 100 mm.

Preparation of Core-Sand and Moulding-Sand Binders

The novolak obtained is mixed with diamides, silanes, and optionally aromatic carboxylic acids in the proportions indicated in the following examples. The binders prepared in this way are removed from the reaction vessel in flake form, and their softening point, flowability or fluidity, and curing time are determined.

The softening point is determined by the capillary method using a melting-point apparatus produced by Electrothermal Engineering Ltd., London, i.e. the temperature at which the binder starts softening is measured.

The flowability and fluidity is determined at 125°C by means of a plate inclined at 64° by the following procedure. 9.2 g of the binder are ground in a mortar and mixed with 0.8 g of hexamethylenetetramine. After homogenization, 0.5 g of the powder is compressed into a tablet having a diameter of 100 mm with the aid of a hand-operated tablet press. The tablet is placed on the small side of a 60 × 150 mm glass plate, which is placed horizontally in an oven kept at a constant temperature of 125°C by a thermostat. After 5 minutes, the plate is inclined to 64° with the aid of an external operating device, so that the tablet remains at the upper end. The tablet is left in this position for 10 minutes, the entire arrangement is taken from the oven, and the traces of the molten binder remaining on the glass plate are measured. The value obtained (mm) is defined as the flowability.

The curing time was determined with the aid of a steel plate with depressions 18 mm in diameter on its surface. The plate is kept at a constant temperature of 150° ± 0.5°C by a thermostat. 0.2 g of the novolak-hexamethylenetetramine mixture used for the determination of the flowability is placed in a depression on the plate and a stop clock is simultaneously started. The mixture is immediately stirred with a glass rod 4 mm in diameter until the resin filament formed when the glass rod is raised breaks as soon as the rod is withdrawn from the depression. The time (sec) that has elapsed up to this instant is referred to as the curing time.

EXAMPLE 1

With a formaldehyde/phenol molar ratio of 0.6:1, a novolak is prepared from 300 parts of phenol and 160 parts of a 36 % aqueous formaldehyde solution. After removal of the reaction water, 16 parts of bis-stearoylethylenediamide, 0.9 part of γ-aminopropyltriethoxysilane, and 9.6 parts of benzoic acid are added.

The binder obtained has the following properties:

| | |
|---|---|
| softening point | 58°C |
| flowability | 90 mm |
| curing time | 65 seconds |

EXAMPLE 2

With a formaldehyde/phenol molar ratio of 0.75:1, a novolak is prepared from 300 parts of phenol and 200 parts of a 36% aqueous formaldehyde solution. After removal of the reaction water, 16 parts of the diamide, 0.9 part of the silane, and 0.6 parts of the aromatic carboxylic acid of Example 1 are added.

The binder obtained has the following properties:

| | |
|---|---|
| softening point | 60°C |
| flowability | 85 mm |
| curing time | 65 seconds |

EXAMPLE 3

With a formaldehyde/phenol molar ratio of 0.85:1, a novolak is prepared from 300 parts of phenol and 226 parts of a 36% formaldehyde solution. After removal of the reaction water, 16 parts of the diamide, 0.9 part of the silane, and 9.6 parts of the aromatic carboxylic acid of Example 1 are added.

The binder obtained has the following properties:

| | |
|---|---|
| softening point | 62°C |
| flowability | 84 mm |
| curing time | 65 seconds |

EXAMPLE 4

A novolak is prepared in accordance with Example 2 with a formaldehyde/phenol molar ratio of 0.75:1. The resin is then mixed with 0.9 part of the silane and 9.6 parts of the aromatic carboxylic acid of Example 1.

The binder obtained has the following properties:

| | |
|---|---|
| softening point | 61°C |
| flowability | 83 mm |
| curing time | 65 seconds |

EXAMPLE 5

A novolak is prepared in accordance with Example 2 with a formaldehyde/phenol molar ratio of 0.75:1. The resin is then mixed with 3 parts of the diamide, 0.9 part of the silane, and 9.6 parts of the aromatic carboxylic acid of Example 1.

The binder obtained has the following properties:

| | |
|---|---|
| softening point | 61°C |
| flowability | 84 mm |
| curing time | 65 seconds |

EXAMPLE 6

A novolak is prepared in accordance with Example 2 with a formaldehyde/phenol molar ratio of 0.75:1. The resin is then mixed with 9 parts of the diamide, 0.9 part of the silane, and 9.6 parts of the aromatic carboxylic acid of Example 1.

The binder obtained has the following properties:

| | |
|---|---|
| softening point | 60°C |
| flowability | 85 mm |
| curing time | 64 seconds |

EXAMPLE 7

A novolak is prepared in accordance with Example 2 with a formaldehyde/phenol molar ratio of 0.75:1. The resin is then mixed with 16 parts of the diamide and 9.6 parts of the aromatic carboxylic acid of example 1.

| | |
|---|---|
| softening point | 62°C |
| flowability | 84 mm |
| curing time | 65 seconds |

EXAMPLE 8

A novolak is prepared in accordance with Example 2 with a formaldehyde/phenol molar ratio of 0.75:1. When the novolak has a fluidity of 120 mm, 16 parts of the diamide, 0.9 part of the silane, and 9.6 parts of the aromatic carboxylic acid of Example 1 are added.

The binder obtained has the following properties:

| | |
|---|---|
| softening point | 52°C |
| flowability | 103 mm |
| curing time | 64 seconds |

Preparation of Coated Moulding Sand

The binders of Examples 1 to 8 are used in the following formulation for the coating of moulding sand:
1000 g of French quartz sannd quality 65 AFA
30 g of binder
4.2 g of hexamethylenetetramine The moulding sand is introduced into a suitable mixer at 130° to 160°C, and the binder is added and mixed for 1 minute. An aqueous solution of hexamethylenetetramine is then added and mixing is continued for a further 90 seconds; the moulding composition is then removed and cooled. Test specimens are prepared from the coated moulding sand in accordance with the DIN 52 404 standard. The specimens are prepared with a shooting machine of the type "Dependable" Model 100 at a shooting pressure of 4 kg/cm$^2$. The coated moulding sand is shot into a mould held at 230° to 240°C, the shooting time being 10 seconds and the baking time 150 seconds. The specimens are then removed and cooled to 25°C. The bending strength (kg/cm$^2$) and the mould release properties of the specimens are determined. The results are shown in the following table:

Table

| Example | Bending strength | Scaling | Release from mould |
|---|---|---|---|
| 1 | 62 | — | good |
| 2 | 62 | — | good |
| 3 | 48 | — | good |
| 4 | 45 | — | inadequate |
| 5 | 48 | — | inadequate |
| 6 | 54 | — | poor |
| 7 | 58 | — | good |
| 8 | 50 | — | good |

What we claim is:

1. Foundry binders on the basis of phenolic resins, comprising
   a. a novolak prepared by condensation of phenol with formaldehyde in a molar ratio of about 1:0.4 to 0.9 in the presence of an acid catalyst and having a fluidity of about 90–110 mm,
   b. about 0.05 to about 1.0 wt.% of a silane having the general formula $$R'Si(OR)_3$$

where R is a methyl or ethyl group and R' is a residue which is a vinyl group or an alkyl residue substituted with mercapto groups, optionally substituted amino residues, epoxyalkyl residues, or epoxycycloalkyl residues, and
   c. about 0.5 to about 8.0 wt.% of the diamide of a long-chain monocarboxylic acid having the general formula $$(RCO)_2-N(CH_2)_n-NH_2$$

where $n$ is an integer from 2 to 6 and R is an alkyl residue with 11 to 20 carbon atoms in the chain, and
   d. about 1.0 to about 6.0 wt.% of an aromatic carboxylic acid.

2. Foundry binders in accordance with claim 1, characterized in that they contain about 3.0 to about 5.0 wt.% of the diamide of a long-chain monocarboxylic acid.

3. Process for the production of the foundry binders in accordance with claim 1, characterized in that
   a. phenol and formaldehyde are allowed to react at temperatures of about 80° to 160°C in a molar ratio of about 1:0.4 to 0.9 in the presence of about 0.1 to about 5.0 wt.%, based on the phenol, of an acid catalyst, until the content of free aldehyde is less than 3 wt.%,
   b. the water liberated is separated from the reaction medium, and
   c. the novolak obtained, with a fluidity of about 90 to 110 mm is mixed with a silane having the general formula $$R'Si(OR)_3$$

where R is a methyl or ethyl group and R' is a residue which is a vinyl group or an alkyl residue substituted with mercapto groups, optionally substituted amino residues, epoxyalkyl residues, or epoxycycloalkyl residues and an aromatic carboxylic acid at temperatures of about 120° to 170°C.

4. Use of the foundry binders in accordance with claim 1 for the hot coating of core and moulding sands in the absence of solvents.

5. Foundry binders in accordance with claim 1, wherein said novolak has a fluidity of 100 to 106 mm.

6. The process in accordance with claim 3, wherein said novolak has a fluidity of 100 to 106 mm.

* * * * *